(No Model.)
T. RODWELL.
TIRE TIGHTENER.
No. 531,064. Patented Dec. 18, 1894.
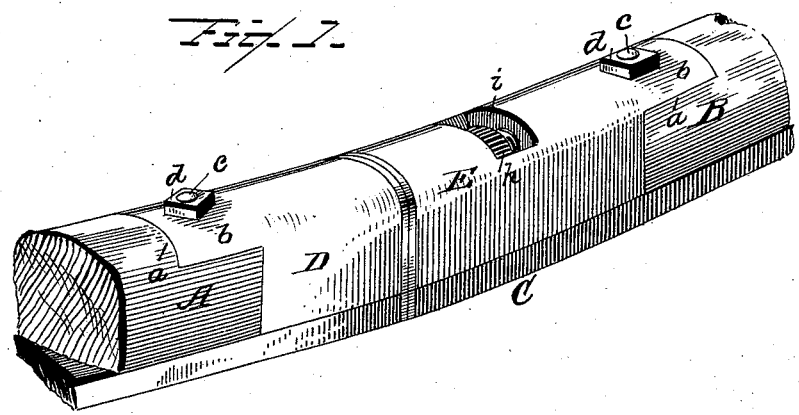
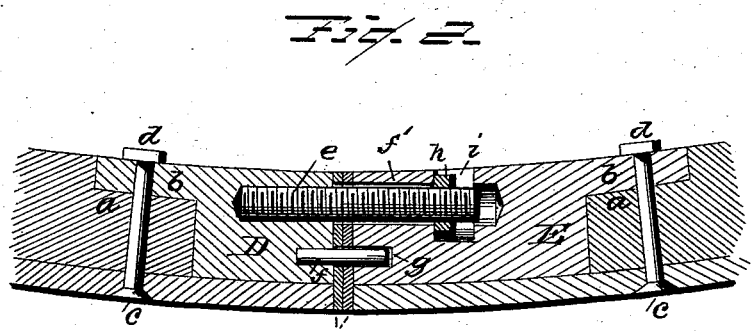
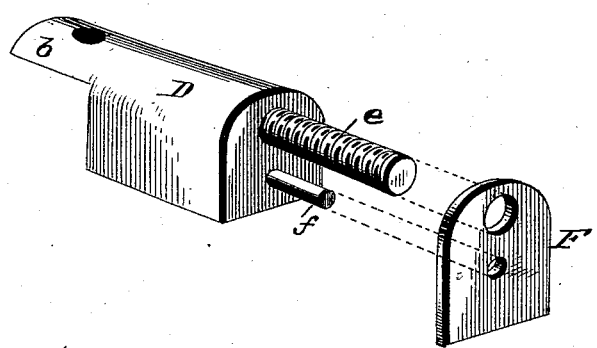
Witnesses
C. J. Williamson
Geo. Goddard
Inventor
Thomas Rodwell.
per Chas. H. Fowler.
Attorney.

UNITED STATES PATENT OFFICE.

THOMAS RODWELL, OF BARABOO, WISCONSIN.

TIRE-TIGHTENER.

SPECIFICATION forming part of Letters Patent No. 531,064, dated December 18, 1894.

Application filed June 22, 1894. Serial No. 515,409. (No model.)

*To all whom it may concern:*

Be it known that I, THOMAS RODWELL, a citizen of the United States, residing at the town of Baraboo, in the county of Sauk and State of Wisconsin, have invented certain new and useful Improvements in Vehicle-Tire Tighteners; and I do hereby declare that the following is a full, clear, and exact description of the same, reference being had to the annexed drawings, making a part of this specification, and to the letters of reference marked thereon.

The present invention has for its object to provide a simple and effective means for tightening the tires upon vehicle wheels that will possess strength and durability and that may be easily operated, and consists in the details of construction substantially as shown in the drawings and hereinafter described and claimed.

Figure 1 represents a perspective view of a portion of the rim of a vehicle wheel with my invention applied thereto; Fig. 2, a longitudinal section thereof; Fig. 3, a detail perspective view of the tightening device.

In the accompanying drawings A B represent two of the adjoining fellies of a vehicle wheel and C the tire thereof, which may be of the usual construction.

The fellies A B at their inner ends are rabbeted to form seats $a$ for the flanged extensions $b$, and are connected to the fellies by means of screw bolts $c$ and nuts $d$, said bolts extending through the flanged extensions and the fellies and also the tire. The extensions $b$ are formed upon the inner ends of metal blocks D E, which blocks form a continuation of the fellies, and are of substantially the same shape in cross section. The block D has rigidly connected to it a screw $e$ and also a guide pin $f$, said screw passing through a hole $f'$ and the guide-pin extending into a guide-mortise $g$ upon the end of the opposite felly E, as shown in Fig. 2. A suitable tightening nut $h$ engages the threads upon the screw $e$ and is located within a chamber $i$ formed in the block E. Jamb-plates F are interposed between the ends of the blocks D E and have openings to receive the screw and guide-pin. Any number of these jamb-plates may be used as found necessary to compensate for the space between the ends of the blocks. The nut upon the screw when turned in the proper direction, will diminish the space between the blocks by drawing them toward each other and thus tighten the tire by diminishing the circumference of the rim of the wheel.

The guide-pin hereinbefore described serves to retain the two blocks in a true line with each other when in the act of tightening the tire.

The tightening device may be applied to one or more points in the rim of the wheel and set up will serve to tighten the rim or sections thereof on the spokes by reason of contracting the circumference of said rim.

The blocks are detachably connected to the fellies by means of the screw-bolts and nuts, and can be applied to any rim of a vehicle wheel by simply rabbeting the inner ends of the two adjoining fellies.

Having now fully described my invention, what I claim as new, and desire to secure by Letters Patent, is—

A tire-tightener, consisting of two blocks connected to the inner ends of the two adjoining fellies, a screw and guide-pin connected to one of the blocks, a hole and a guide-mortise in the end of the opposite block, to receive the ends of the screw and guide pin respectively, a nut upon the screw, and jamb-plates interposed between the blocks, substantially as and for the purpose set forth.

In testimony that I claim the above I have hereunto subscribed my name in the presence of two witnesses.

THOS. RODWELL.

Witnesses:
R. D. EVANS,
C. H. DAVIS.